United States Patent
Oikawa

(10) Patent No.: US 6,202,113 B1
(45) Date of Patent: *Mar. 13, 2001

(54) BANK REGISTER CIRCUIT FOR A MULTIPLY ACCUMULATE CIRCUIT

(75) Inventor: Kiyoharu Oikawa, Tokyo (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,065

(22) Filed: Oct. 24, 1997

(30) Foreign Application Priority Data

Oct. 25, 1996 (JP) .................................................... 8-284319

(51) Int. Cl.[7] .................................................... G06F 13/00
(52) U.S. Cl. ............................................................ 710/129
(58) Field of Search ..................................... 710/126–130

(56) References Cited

U.S. PATENT DOCUMENTS

| 4,016,551 | * | 4/1977 | Carberry | 340/173 R |
|---|---|---|---|---|
| 4,686,553 | * | 8/1987 | Possin et al. | 357/23.7 |
| 4,704,623 | * | 11/1987 | Piper et al. | 357/23.7 |
| 4,837,743 | * | 6/1989 | Chiu et al. | 371/51 |
| 4,912,636 | * | 3/1990 | Magar et al. | 364/200 |
| 4,982,247 | * | 1/1991 | Aoki et al. | 357/22 |
| 5,060,145 | * | 10/1991 | Scheuneman et al. | 364/200 |
| 5,222,039 | * | 6/1993 | Vinal | 365/156 |
| 5,249,280 | * | 9/1993 | Nash et al. | 395/425 |
| 5,339,448 | * | 8/1994 | Tanaka et al. | 395/775 |
| 5,633,183 | * | 5/1997 | Swirhum | 438/285 |
| 5,678,058 | * | 10/1997 | Sato | 395/800 |

OTHER PUBLICATIONS

"Microsoft Press Computer Dictionary", Second Edition, 1994.*

* cited by examiner

Primary Examiner—David A. Wiley
(74) Attorney, Agent, or Firm—Oblon, Spivak, McClelland, Maier & Neustadt, P.C.

(57) ABSTRACT

A bank register circuit for an MAC employs compact bank registers and involves a short read time for transferring data to a system bus. The bank register circuit has a dedicated write bus (5), a dedicated read bus (6), and an interface (7) between the bank registers (2, 3) and the system bus (4), to transfer data between the bank registers (2, 3) and the system bus (4).

8 Claims, 12 Drawing Sheets

*FIG. 10A* *FIG. 10B*
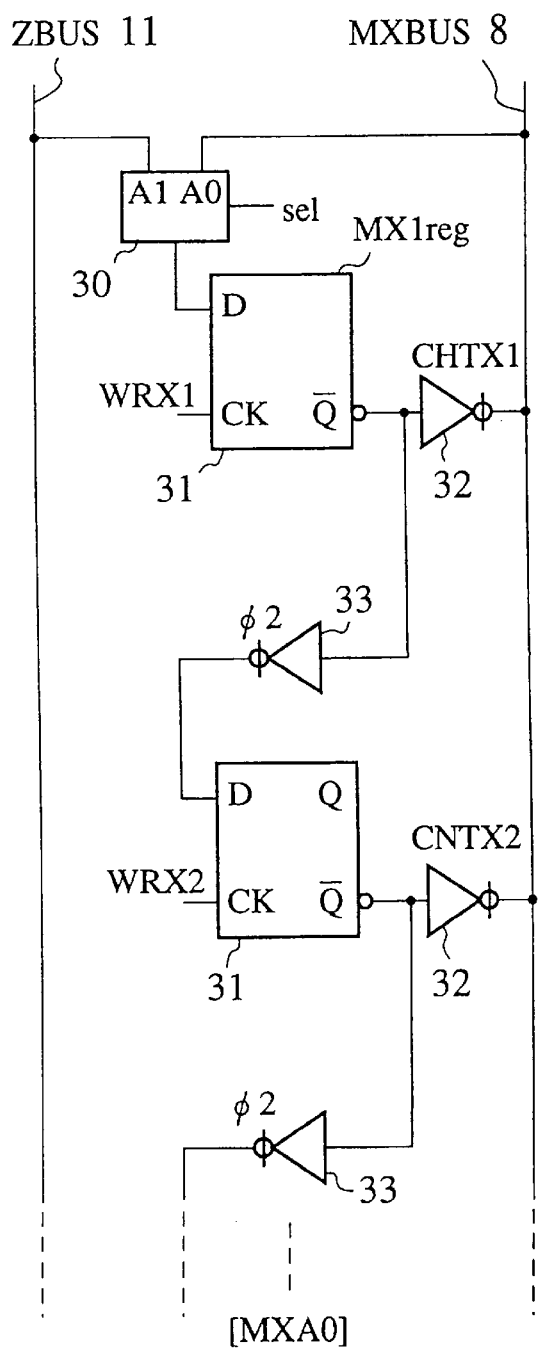
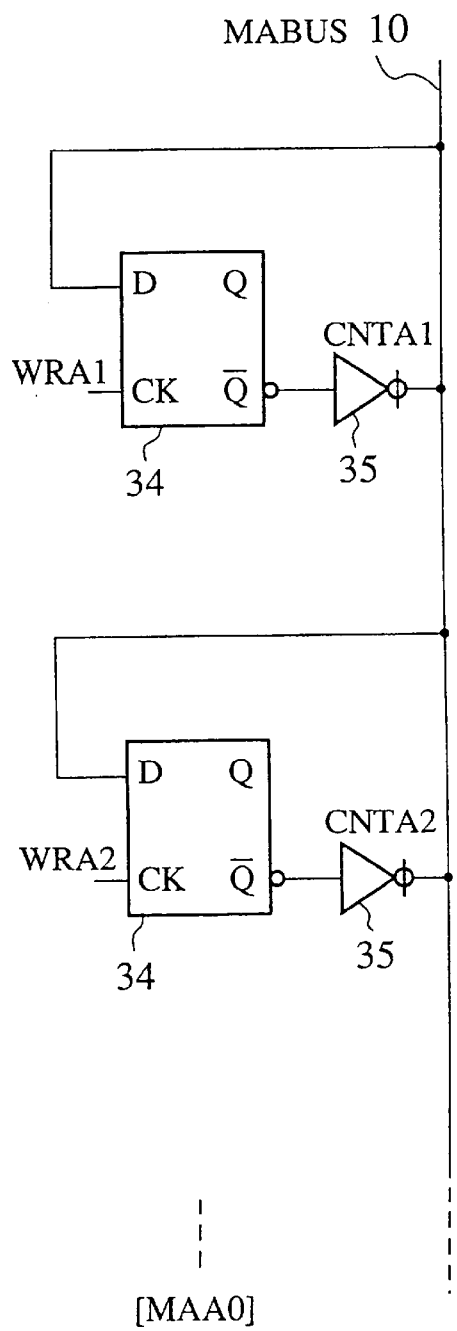

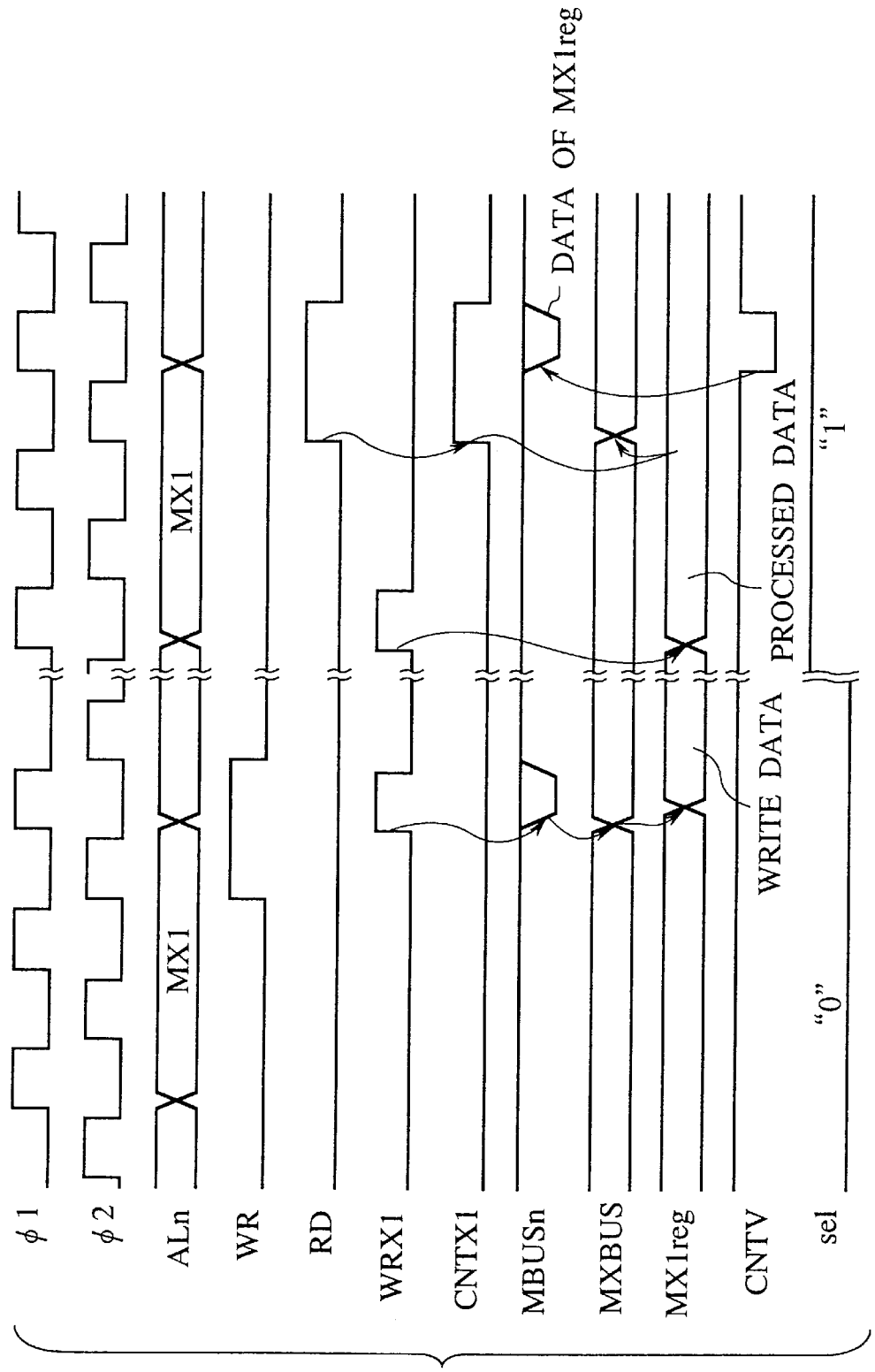

BANK REGISTER CIRCUIT FOR A MULTIPLY ACCUMULATE CIRCUIT

BACKGROUND OF THE INVENTION

1. Field of the Invention

The present invention relates to a bank register circuit for holding data to be supplied to a multiply accumulate circuit (a device for carrying out a sum-of-products operation hereafter referred to as "MAC") of a microcomputer or a DSP (digital signal processor).

2. Description of the Prior Art

FIG. 1 shows a bank register circuit according to prior art.

The bank register circuit 100 consists of a bank register group 101 including bank registers MXA0 to MXAn and a bank register group 102 including bank registers MAA0 to MAAn. Data held in the bank register group 101 is supplied as input data to a sum-of-products unit 104 through an MX-bus 103. Data held in the bank register group 102 is supplied as coefficient data to the sum-of-products unit 104 through an MA-bus 105. The bank register groups 101 and 102 send and receive data to and from a system bus (M-bus) 106. The sum-of-products unit 104 provides an operation result to the bank register group 101 through a Z-bus 107, and the bank register group 101 holds the same.

FIG. 2A shows some of the bank registers incorporated in the bank register group 101. Each of the bank registers is composed of a write circuit 108, a flip-flop 109, a NOR gate 110, a read circuit 111, and an output circuit 112. The write circuit 108 selects data in one of the system bus 106 and Z-bus 107 and writes the selected data into the bank register. The flip-flop 109 fetches the selected data in synchronization with a write enable signal (one of WRX1 to WRXn) as shown in the timing chart of FIG. 3 and holds the data. The NOR gate 110 provides the NOR of the data held in the flip-flop 109 and a read enable signal (one of RDX1V to RDXnV). The read circuit 111 is an n-channel FET whose conductivity is controlled by the output of the NOR gate 110 and which is connected to the system bus 106, to provide the held data to the system bus 106 at the timing shown in FIG. 3. The output circuit 112 is a clocked inverter connected to the MX-bus 103 and provides the held data to the MX-bus 103 in response to an output enable signal (one of BX1 to BXn). The flip-flops 109 of the bank registers are cascaded to one another through clocked inverters 113.

FIG. 2B shows some of the bank registers incorporated in the bank register group 102. Each of the bank registers is composed of a flip-flop 114, a NOR gate 115, a read circuit 116, and an output circuit 117. The flip-flop 114 fetches data from the system bus 106 in synchronization with a write enable signal (one of WRA1 to WRAn) and holds the data. The NOR gate 115 provides the NOR of the data held in the flip-flop 114 and a read enable signal (one of RDA1V to RDAnV). The read circuit 116 is an n-channel FET whose conductivity is controlled by the output of the NOR gate 115 and which is connected to the system bus 106, to provide the held data to the system bus 106. The output circuit 117 is a clocked inverter whose conductivity is controlled by an output enable signal (one of A1 to An) and which provides the held data to the MA-bus 105.

According to this prior art, the system bus 106 receives large capacitance from the read circuits 111 and 116 connected thereto. This capacitance increases as the number of bank registers in the bank register groups 101 and 102, i.e., the number of read circuits 111 and 116 therein increases. Then, the read circuits 111 and 116 must have large driving capabilities. When the read circuits 111 and 116 are made of FETs as shown in FIG. 2, the FETs must be large. This results in increasing the size of the bank register circuit 100, the core size of the MAC, and the chip size of the system.

Large load capacitance on the system bus 106 slows down a speed of reading data from the bank registers for the system bus 106, to deteriorate a system operation frequency margin or a minimum operation source voltage margin.

In this way, the bank register circuit 100 of the prior art connects the read circuits 111 and 116 of the bank registers all in parallel to the system bus 106, to greatly increase load capacitance on the system bus 106. Each bank register having a read circuit (111 or 116) of large driving capability is unavoidably large to slow down a speed of reading data for the system bus 106.

SUMMARY OF THE INVENTION

An object of the present invention is to provide a compact bank register circuit for an MAC.

Another object of the present invention is to provide a bank register circuit for an MAC, capable of shortening a read time of data for a system bus.

In order to accomplish the objects, the present invention provides a bank register circuit for an MAC, having bank registers for holding data supplied to and received from the MAC, a dedicated write bus connected to the bank registers, for transferring data from a system bus to the bank registers, a dedicated read bus connected to the bank registers, for transferring data from the bank registers to the system bus, and a bus interface arranged between and connected to the system bus and the dedicated write and read buses, for interfacing data transfer between the system bus and the dedicated write and read buses.

According to the present invention, the timing of reading data from the bank registers for the dedicated read bus may be sooner than the timing of reading data from the bank registers for the system bus.

The bus interface of the present invention may have a write circuit made of an inverter string for writing data of the system bus into the dedicated write bus, a NAND gate for providing the NAND of a clock signal, a read control signal, and a bank register area signal that specifies a bank register, a hold circuit connected to the dedicated read bus, for temporarily holding data of the dedicated read bus, a NOR gate for providing the NOR of the output of the NAND gate and data in the dedicated read bus, and a read circuit made of an FET whose conductivity is controlled by the output of the NOR gate, for passing data from the dedicated read bus to the system bus.

Another aspect of the present invention provides a bank register circuit for an MAC, having bank registers for holding data supplied to or received from the MAC, a data transfer bus connected to the bank registers and MAC, for transferring data from a system bus to the bank registers, from bank registers to the MAC, and from the bank registers to the system bus, and a bus interface arranged between and connected to the system bus and the data transfer bus, for interfacing data transfer between the system bus and the data transfer bus.

The timing of reading data from the bank registers for the data transfer bus is sooner than the timing of reading data from the bank registers for the system bus.

The bus interface may have an inverter string including a clocked inverter whose conductivity is controlled by the product of a write control signal and a bank register area signal, for passing data from the system bus to the data transfer bus, a hold circuit connected to the data transfer bus, for temporarily holding data of the data transfer bus, a NAND gate for providing the NAND of a clock signal, a read control signal, and a bank register area signal, a NOR gate for providing the NOR of the output of the NAND gate and data from the data transfer bus, and a read circuit made of an FET whose conductivity is controlled by the output of the NOR gate, for passing data from the data transfer bus to the system bus.

BRIEF DESCRIPTION OF THE DRAWINGS

FIG. 10 shows the details of bank registers contained in the circuit of FIG. 9;

FIG. 12 is a timing chart showing the operation of the circuit of FIG. 9.

DETAILED DESCRIPTION OF THE EMBODIMENTS

The embodiments of the present invention will be described with reference to the accompanying drawings.

Figure 4:
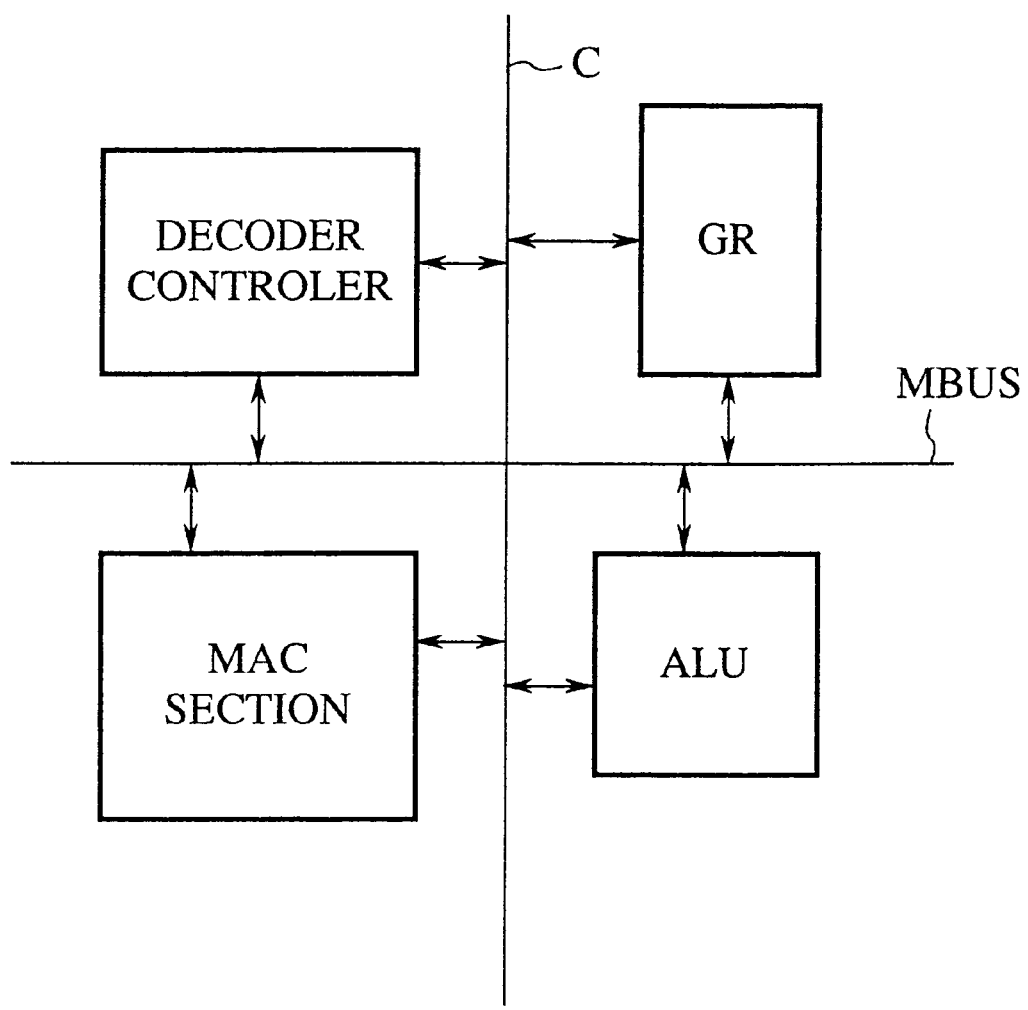
FIG. 4 shows a system including a bank register circuit according to the present invention.
Figure 5:
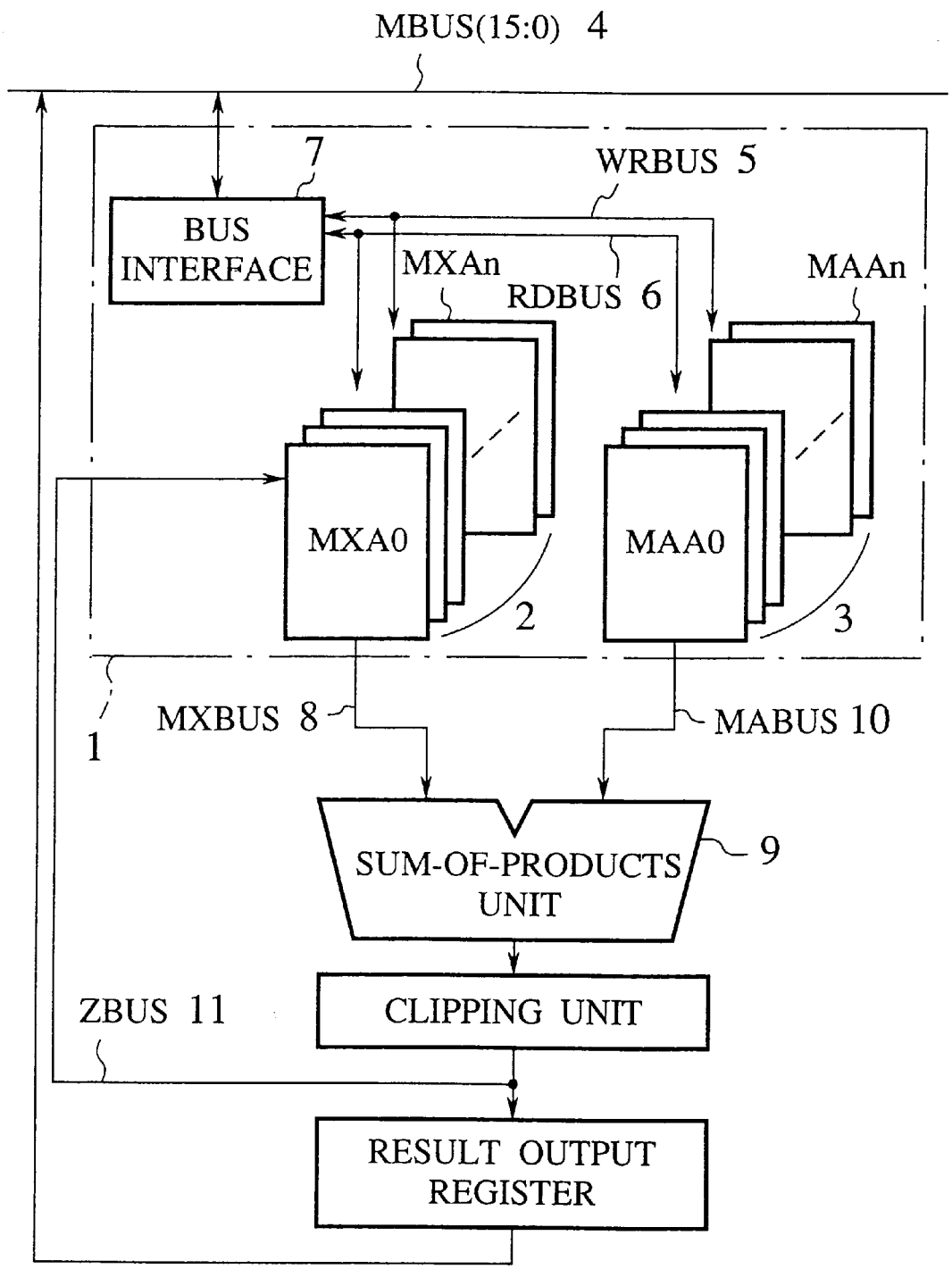
FIG. 5 shows a bank register circuit for an MAC, according to a first embodiment of the present invention.
Figure 6A:
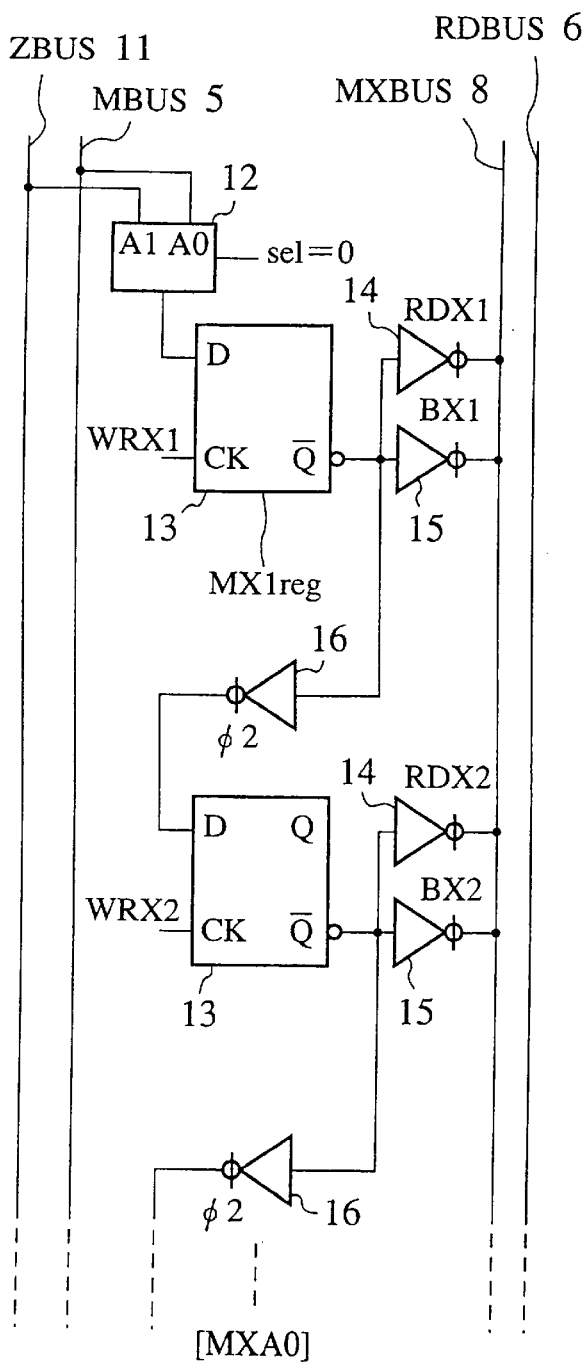
FIG. 6 shows the details of bank registers contained in the circuit of FIG. 5.
Figure 6B:
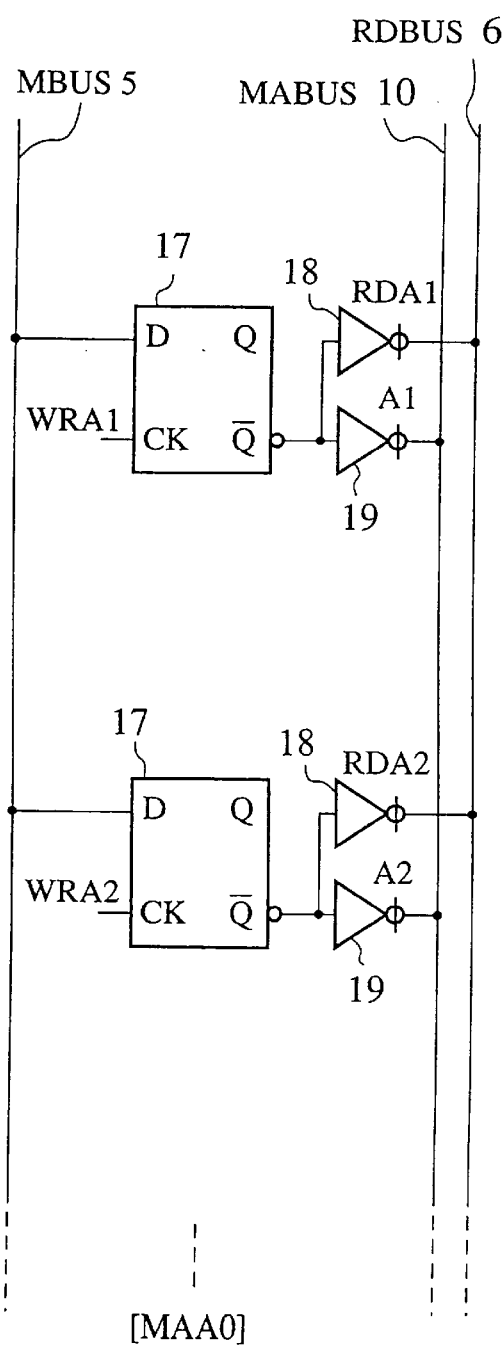
Figure 7:
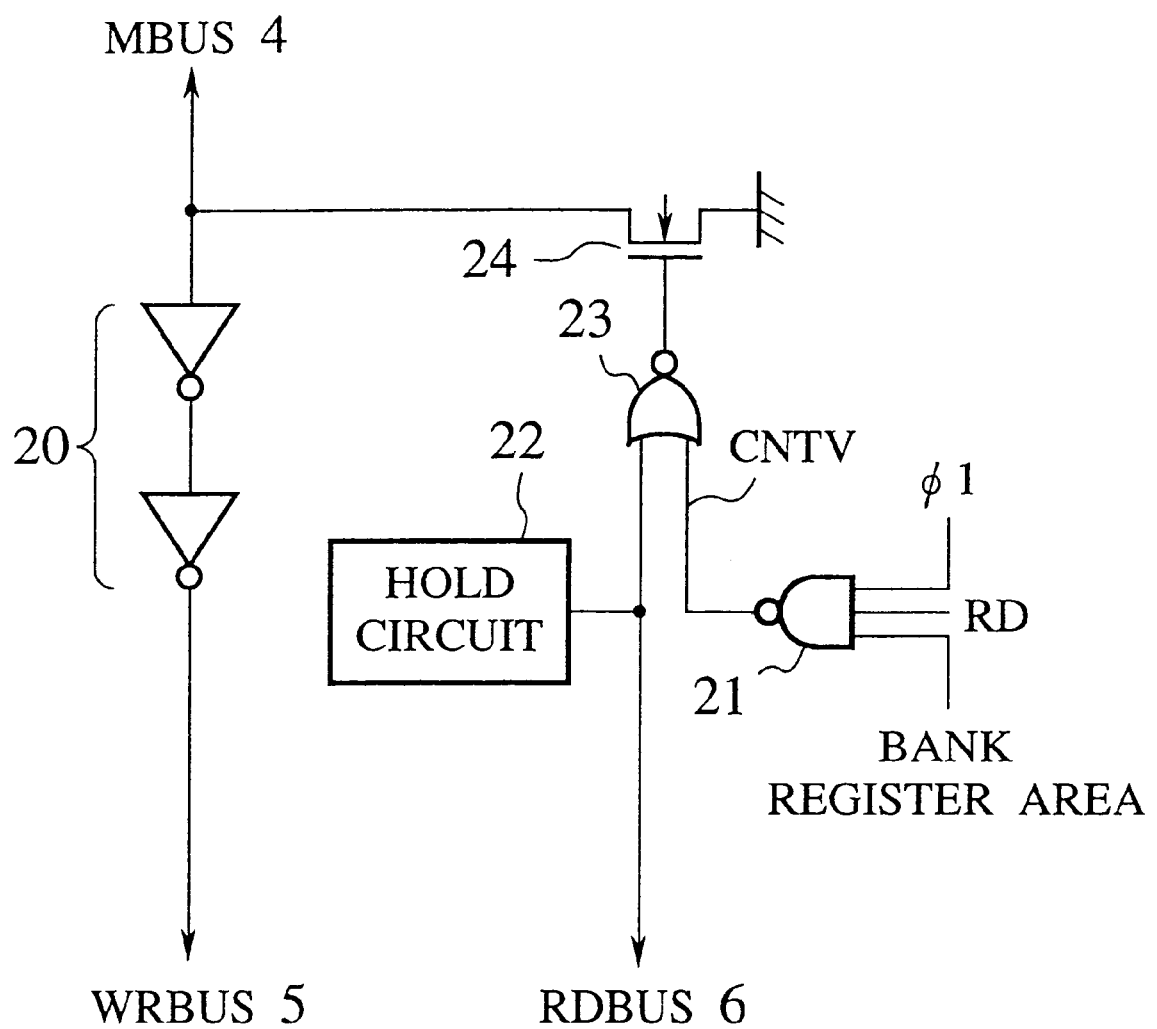
FIG. 7 shows the details of a bank interface contained in the circuit of FIG. 5.
Figure 8:
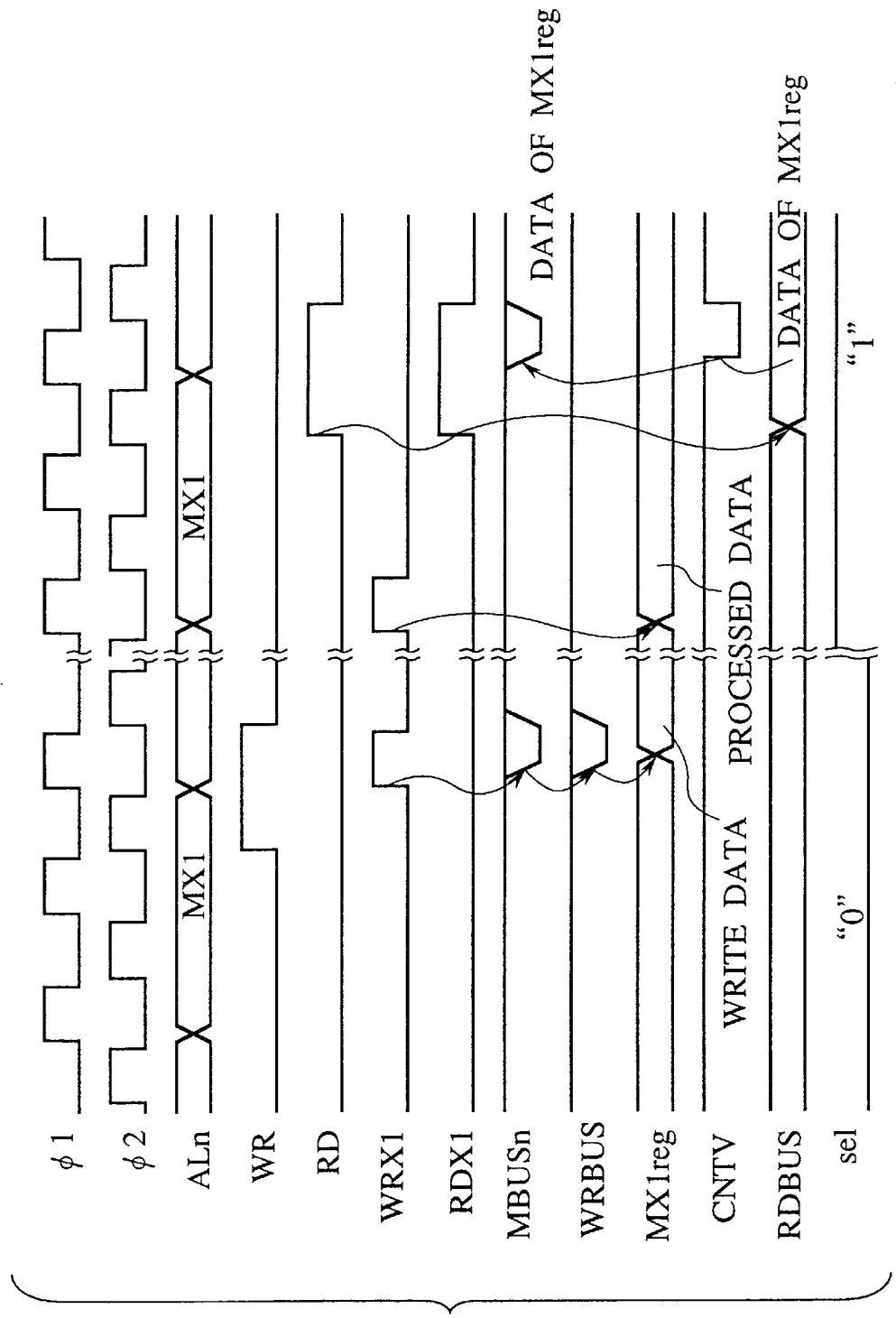
FIG. 8 is a timing chart showing the operation of the circuit of FIG. 5.

FIG. 5 shows a bank register circuit for an MAC, according to the first embodiment of the present invention, FIG. 4 shows a system employing the bank register circuit of FIG. 5, FIG. 6 shows the details of bank registers contained in the circuit of FIG. 5, FIG. 7 shows the details of a bank interface contained in the circuit of FIG. 5, and FIG. 8 is a timing chart showing the operation of the circuit of FIG. 5.

The system of FIG. 4 is realized in, for example, a standard microprocessor. A decoder controller decodes an externally supplied instruction and supplies control signals to a general purpose register GR, an execution unit ALU, etc., through a control line C, so that the instruction is executed. Data necessary for executing the instruction is transferred through a system bus (MBUS). An MAC section carries out sum-of-products operations. The details of the MAC section characteristic to the present invention are shown in FIG. 5.

In FIG. 5, a bank register circuit 1 has a bank register group 2 including bank registers MXA0 to MXAn and a bank register group 3 including bank registers MAA0 to MAAn. The bank register groups 2 and 3 are connected to a dedicated write bus (WRBUS) 5 for transferring data from the system bus 4 to the bank register groups 2 and 3. The bank register groups 2 and 3 are also connected to a dedicated read bus (RDBUS) 6 for transferring data from the bank register groups 2 and 3 to the system bus 4. A bus interface 7 is arranged between and connected to the system bus 4 and the dedicated write and read buses 5 and 6, for interfacing data transfer between them. Data stored in the bank register group 2 is supplied as input data to a sum-of-products unit 9 through an input data bus (MXBUS) 8. Data stored in the bank register group 3 is supplied as coefficient data to the sum-of-products unit 9 through an input data bus (MABUS) 10. An operation result from the sum-of-products unit 9 is supplied to the bank register group 2 through a Z-bus 11 and is stored therein.

The sum-of-products unit 9 repeats sum-of-products operations while clipping results and returns a final operation result to the system bus 4. The sum-of-products unit 9 may be a conventional one.

FIG. 6A shows some of the bank registers contained in the bank register group 2. Each of the bank registers consists of a write circuit 12, a flip-flop 13 (one of MX1reg to MXnreg), a read circuit 14, and an output circuit 15. The write circuit 12 selects data in one of the system bus 4 and Z-bus 11 and writes the selected data into the bank register. The flip-flop 13 fetches the selected data in synchronization with a write enable signal (one of WRX1 to WRXn) as shown in the timing chart of FIG. 7 and holds the data. The read circuit 14 is a clocked inverter whose conductivity is controlled by a read enable signal (one of RDX1 to RDXn) and which is connected to the dedicated read bus 6, to pass the data stored in the flip-flop 13 to the bus 6 at the timing shown in FIG. 8. The output circuit 15 is a clocked inverter whose conductivity is controlled by an output enable signal (one of BX1 to BXn) and which is connected to the input data bus 8, to pass the data stored in the flip-flop 13 to the bus 8. The flip-fops 13 are cascaded to one another through clocked inverters 16.

FIG. 6B shows some of the bank registers contained in the bank register group 3. Each of the bank registers consists of a flip-flop 17, a read circuit 18, and an output circuit 19. The flip-flop 17 fetches data from the dedicated write bus 5 in synchronization with a write enable signal (one of WRA1 to WRAn) as shown in the timing chart of FIG. 8 and holds the data. The read circuit 18 is a clocked inverter whose conductivity is controlled by a read enable signal (one of RDA1 to RDAn) and which is connected to the dedicated read bus 6, to pass the data stored in the flip-flop 17 to the bus 6 at the timing shown in FIG. 8. The output circuit 19 is a clocked inverter whose conductivity is controlled by an output enable signal (one of A1 to An) and which is connected to the input data bus, to pass the data held in the flip-flop 17 to the bus 10.

FIG. 7 shows the details of the bank interface 7. A write circuit 20 is an inverter string for writing data of the system bus 4 into the dedicated write bus 5. A NAND gate 21 provides the NAND of a clock signal φ1, a read control signal RD, and a bank register area signal (decode signal of AL1 to ALn) that specifies a bank register. A hold circuit 22 is connected to the dedicated read bus 6 and temporarily holds data of the dedicated read bus 6. A NOR gate 23 provides the NOR of the output (CNTV) of the NAND gate 21 and data from the bus 6. A read circuit 24 is an n-channel FET whose conductivity is controlled by the output of the NOR gate 23 and which passes data from the bus 6 to the system bus 4.

Figure 1:
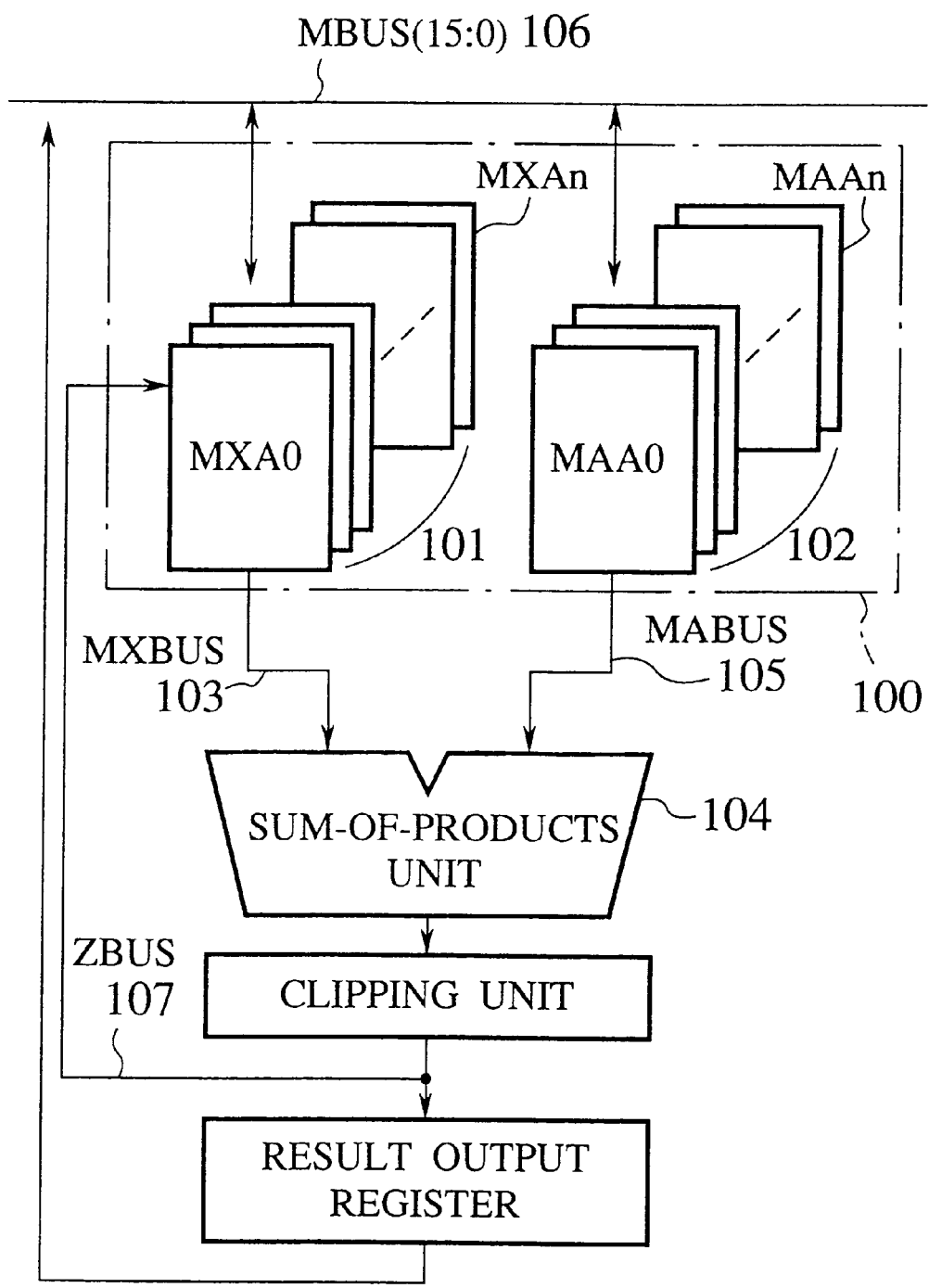
FIG. 1 shows a bank register circuit for an MAC, according to a prior art.
Figure 2A:
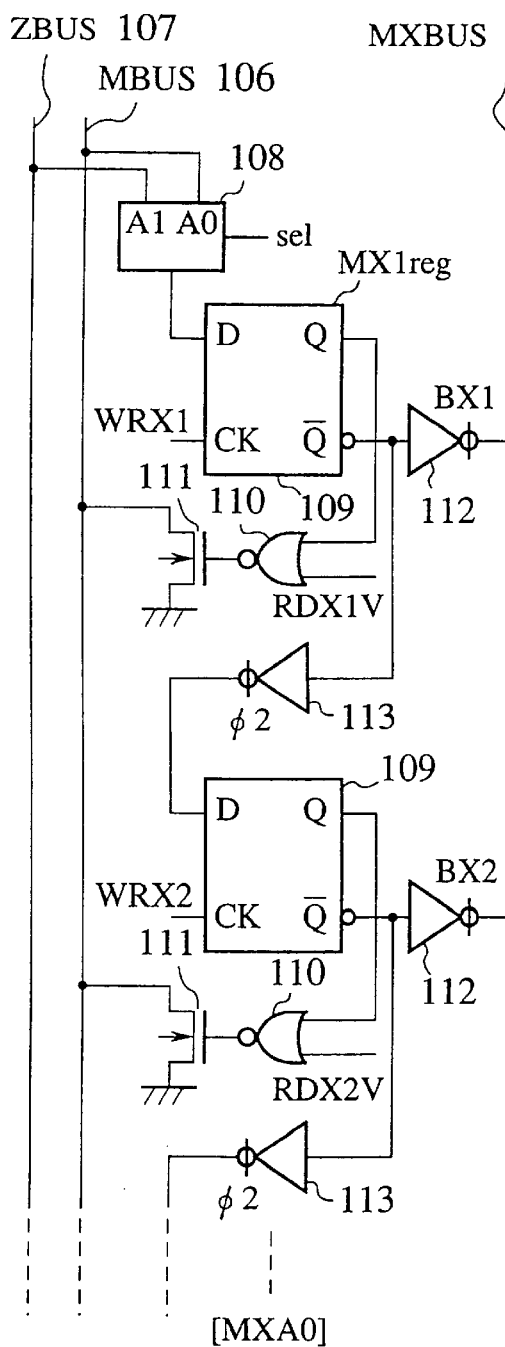
FIG. 2 shows the details of bank registers contained in the circuit of FIG. 1.
Figure 2B:
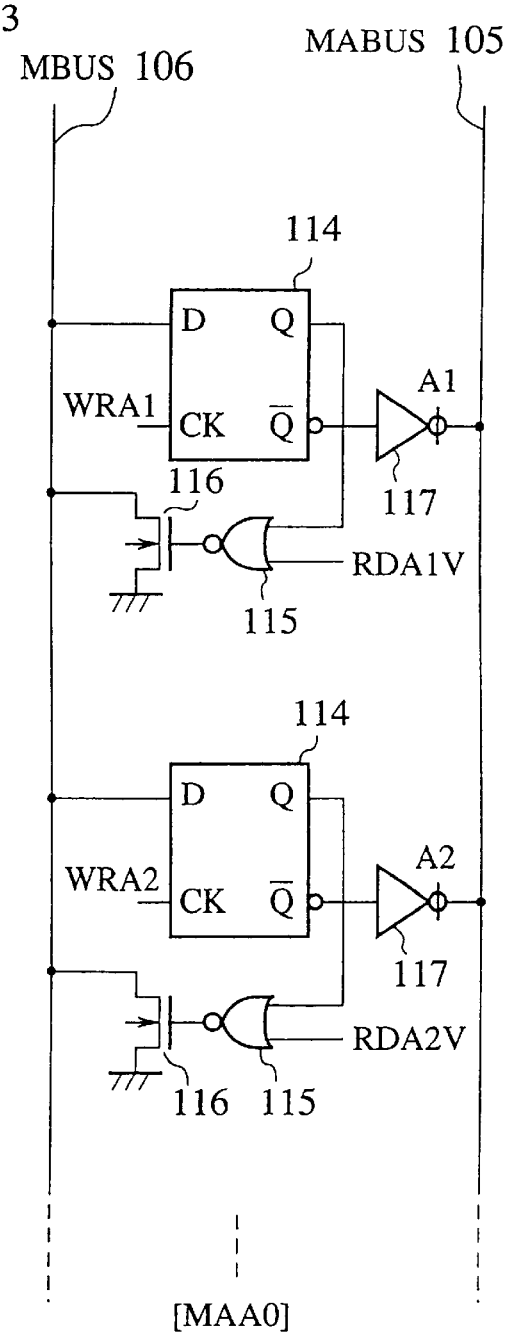
Figure 3:
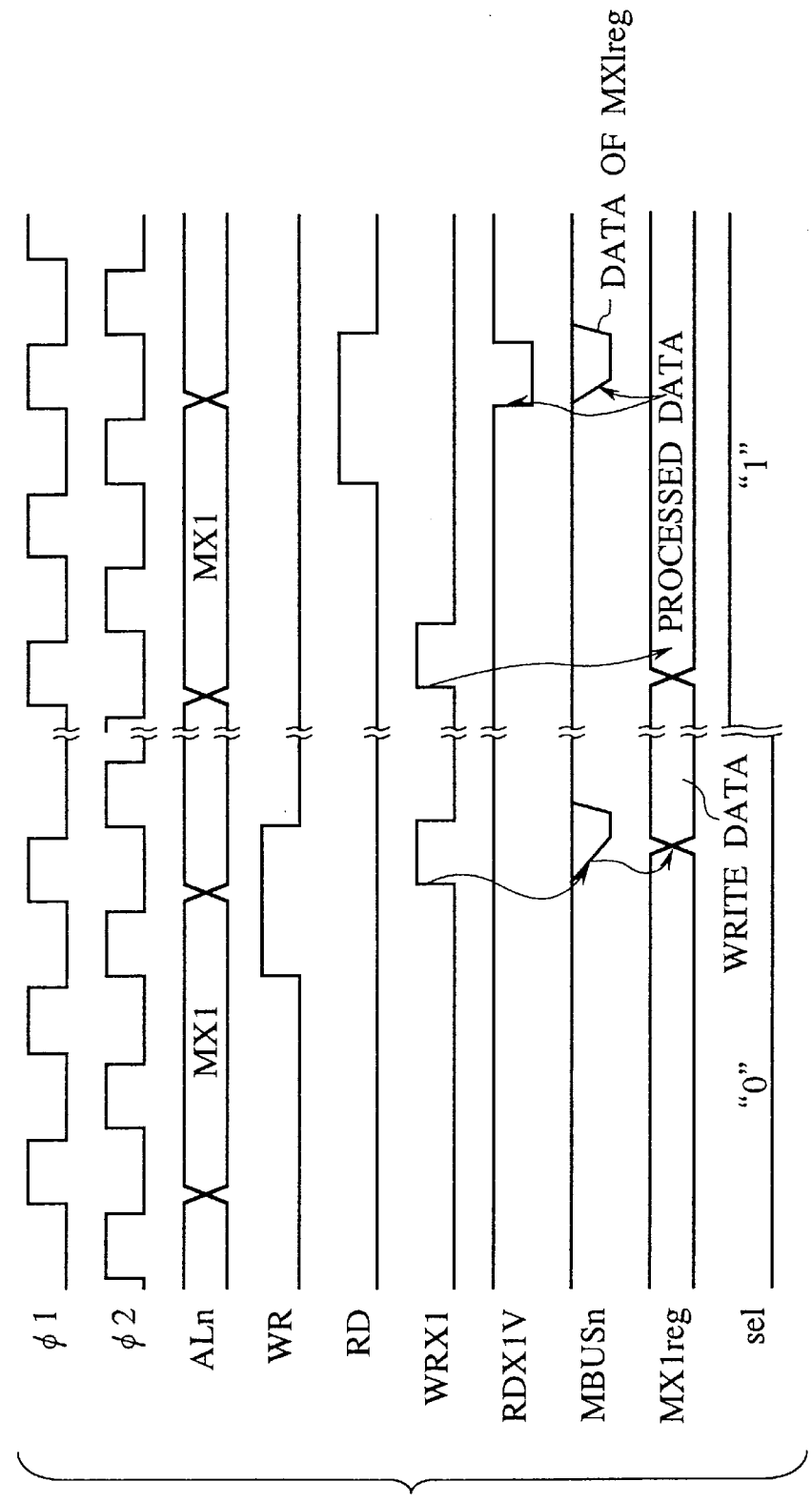
FIG. 3 is a timing chart showing the operation of the circuit of FIG. 1.

Load capacitance on the system bus 4 of the embodiment will be compared with that of the prior art of FIG. 2.

According to the prior art, the register group 101 includes n registers, the register group 102 includes m registers, each flip-flop 114 has an input capacitance (gate capacitance when FETs are used) of C1, each of the read circuits 111 and 116 has a drain capacitance of C2, and each write circuit 108 has capacitance that can be ignored. Then, the system bus 106 receives a capacitance C of (C1×m)+(C2×(n+m)). On the other hand, the write circuit 20 of the bus interface 7 of the embodiment has a gate capacitance of C3, and the read circuit 24 thereof has a drain capacitance of C4. Then, the system bus 4 of the embodiment receives a capacitance C of (C3+C4) without regard to the number of the bank registers.

If the capacitance of (C1+C2) is substantially equal to the capacitance of (C3+C4), the embodiment can greatly reduce load capacitance on the system bus compared with the prior art, as the sum (n+m) of the registers increases. According to this embodiment, load capacitance on the system bus is irrelevant to the number of bank registers. Accordingly, even if the number of bank registers increases, there will be no increase in load capacitance on the system bus.

Since this embodiment greatly reduces capacitance applied to the system bus, there is no need of increase the driving power of the read circuit that reads data from the bank register, to thereby reduce the size of the transistor that constitutes the read circuit. According to this embodiment, data is read through the dedicated read bus 6 and and is passed to the system bus 4 through the bus interface 7 in order to simplify the structure of each bank register and reduce the number of transistors. Consequently, the bank register circuit 1 of this embodiment has a reduced size.

The timing of reading data from the bank register groups 2 and 3 for the dedicated read bus 6 occurs earlier than the timing of reading data from the bank register groups 2 and 3 directly for the system bus 4. In addition to this, load capacitance on the system bus 4 is small. These factors shorten a time of reading data from any bank register for the system bus 4.

Figure 9:
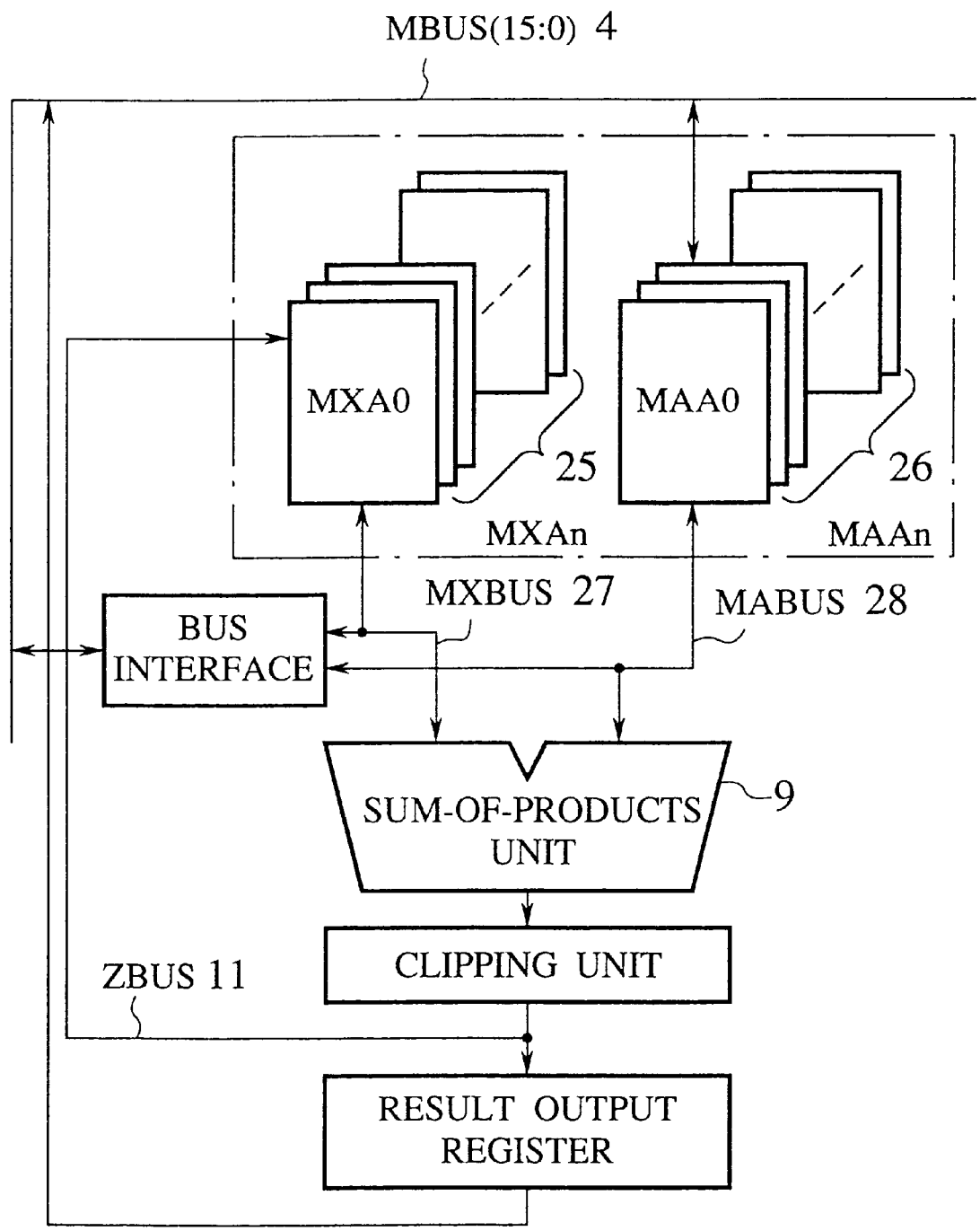
FIG. 9 shows a bank register circuit for an MAC, according to a second embodiment of the present invention.
Figure 11:
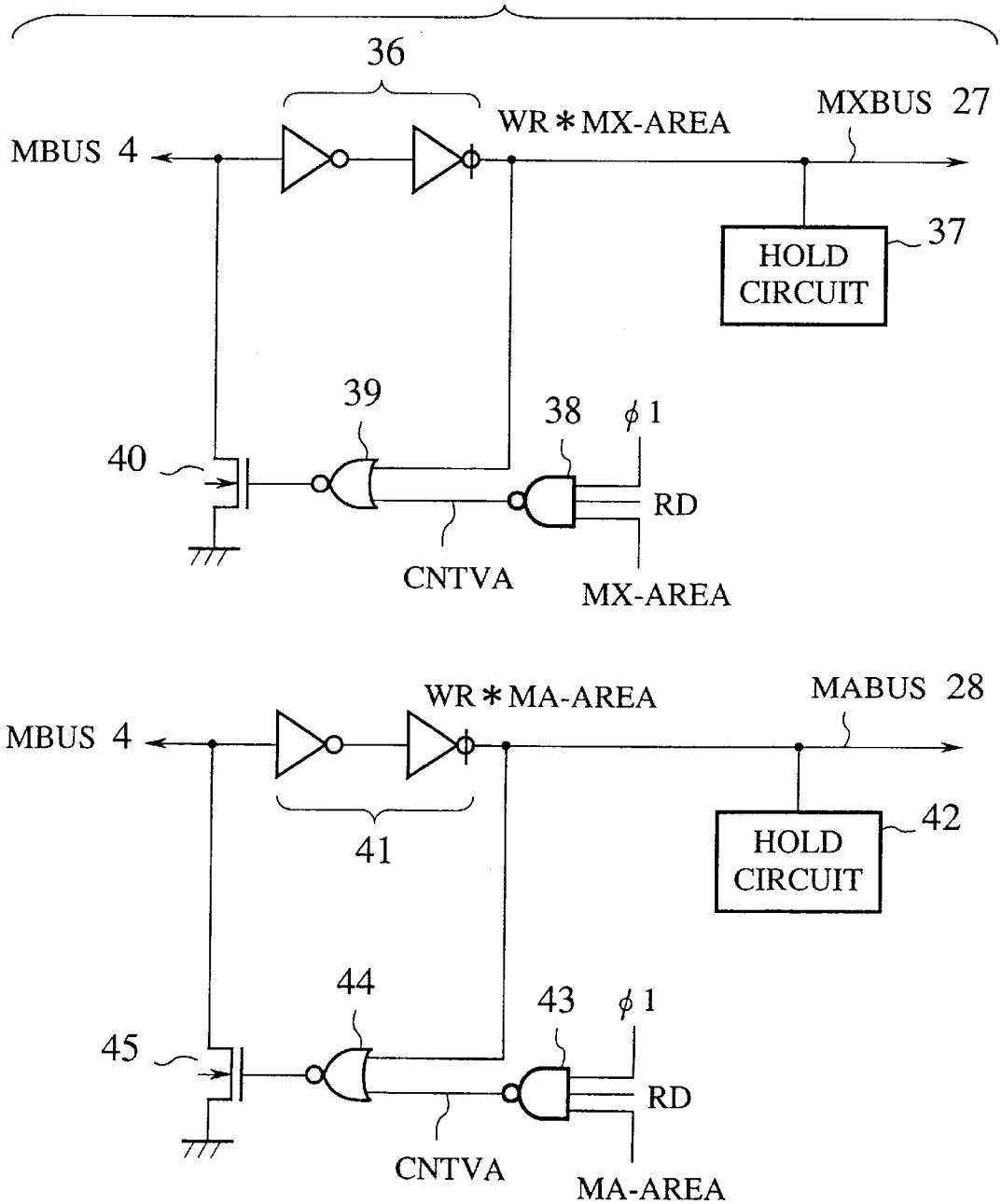
FIG. 11 shows the details of a bank interface contained in the circuit of FIG. 9.

FIG. 9 shows a bank register circuit for an MAC, according to the second embodiment of the present invention, FIG. 10 shows the details of bank registers contained in the circuit of FIG. 9, FIG. 11 shows the details of a bank interface contained in the circuit of FIG. 9, and FIG. 12 is a timing chart showing the operation of the circuit of FIG. 9.

The second embodiment of FIG. 9 has a data transfer bus (MXBUS) 27 serving as the dedicated write and read buses 5 and 6 and input data bus 8 of the first embodiment of FIG. 5. The second embodiment also has a data transfer bus (MABUS) 28 serving as the dedicated write and read buses 5 and 6 and input data bus 10 of the first embodiment. The second embodiment further has a bus interface 29 instead of the bus interface 7 of the first embodiment. The bus interface 29 is arranged between and connected to a system bus 4 and the data transfer buses 27 and 28, for interfacing data transfer between them.

FIG. 10A shows some bank registers contained in a bank register group 25 of the second embodiment. Each of the bank registers consists of a write circuit 30, a flip-flop 31, and a read circuit 32. The write circuit 30 selects data in one of the data transfer bus 27 and a Z-bus 11 and writes the selected data into the bank register. The flip-flop 31 (one of MX1reg to MXnreg) fetches the selected data in synchronization with an enable signal (one of WRX1 to WRXn) as shown in the timing chart of FIG. 12 and holds the data. The read circuit 32 is a clocked inverter whose conductivity is controlled by a read enable signal (one of CNTX1 to CNTXn) and which transfers the data held in the flip-flop 31 to the data transfer bus 27 at the timing shown FIG. 12. The flip-flops 31 are cascaded to one another through clocked inverters 33.

FIG. 10B shows some bank registers contained in a bang register group 26 of the second embodiment. Each of the bank registers consists of a flip-flop 34 and a read circuit 35. The flip-flop 34 fetches data from the data transfer bus 28 in synchronization with a write enable signal (one of WRA1 to WRAn) as shown in the timing chart of FIG. 12 and holds the data. The read circuit 35 is a clocked inverter whose conductivity is controlled by a read enable signal (one of CNTA1 to CNTAn) and which is connected to the data transfer bus 28, to pass the data stored in the flip-flop 34 to the bus 28 at the timing shown in FIG. 12.

FIG. 11 shows the details of the bank interface 29. A write circuit 36 is an inverter string including a clocked inverter whose conductivity is controlled by the product of a write control signal WR and an MX-area signal that indicates a bank register in the bank register group 24, to write data of the system bus 4 into the data transfer bus 27. A hold circuit 37 is connected to the data transfer bus 27, to temporarily hold data of the data transfer bus 27. A NAND gate 38 provides the NAND of a clock signal $\phi 1$, a read control signal RD, and an MX area signal (decode signal of AL1 to ALn) that indicates a bank register in the bank register group 25. A NOR gate 39 provides the NOR of the output CNTVA of the NAND gate 38 and data from the data transfer bus 27. A read circuit 40 is an n-channel FET whose conductivity is controlled by the output of the NOR gate 39 and which passes data from the data transfer bus 27 to the system bus 4. A write circuit 41 is an inverter string including a clocked inverter whose conductivity is controlled by the product of a write control signal WR and an MA-area signal that indicates a bank register in the bank register group 26, to write data of the system bus 4 into the data transfer bus 28. A hold circuit 42 is connected to the data transfer bus 28, to temporarily hold data of the bus 28. A NAND gate 43 provides the NAND of the clock signal $\phi 1$, read control signal RD, and MA-area signal. A NOR gate 44 provides the NOR of the output CNTVA of the NAND gate 43 and data from the data transfer bus 28. A read circuit 45 is an n-channel FET whose conductivity is controlled by the output of the NOR gate 44, to pass data from the data transfer bus 28 to the system bus 4.

Load capacitance on the system bus 4 of the embodiment will be compared with that of the prior art of FIG. 2. According to the prior art, the register group 101 includes n registers, the register group 102 includes m registers, each flip-flop 114 has an input capacitance (gate capacitance when FETs are used) of C1, each of the read circuits 111 and 116 has a drain capacitance of C2, and each write circuit 108 has capacitance that can be ignored. Then, the system bus 106 receives a capacitance C of (C1×m)+(C2×(n+m)). On the other hand, the write circuits 36 and 41 of the bus interface 29 of the second embodiment have a total gate capacitance of C5, and the read circuits 40 and 45 thereof have a total drain capacitance of C6. Then, the system bus 4 of the second embodiment receives a capacitance C of (C5+C6) without regard to the number of the bank registers.

If the capacitance of (C1+C2) is substantially equal to the capacitance of (C5+C6), the second embodiment can greatly reduce load capacitance on the system bus compared with the prior art, as the sum (n+m) of the registers increases. According to the second embodiment, load capacitance on the system bus is irrelevant to the number of the bank registers. Accordingly, even if the number of the bank registers increases, there will be no increase in load capacitance on the system bus.

Since the embodiment greatly reduces capacitance applied to the system bus, there is no need of increasing the driving power of the read circuit that reads data from the bank register, to thereby reduce the size of the transistor that constitutes the read circuit. The data transfer buses 27 and 28 of the embodiment serve as a dedicated write bus, a dedicated read bus, and input data buses for a sum-of-products unit 9, and the bus interface 29 interfaces data transfer between the buses 27 and 28 and the system bus 4, to simplify the structure of each bank register and reduce the number of transistors. Consequently, the bank register circuit of the second embodiment has a reduced size.

The timing of reading data from the bank register groups 25 and 26 for the data transfer buses 27 and 28 occurs earlier than the timing of reading data from the bank register groups 25 and 26 directly for the system bus 4. In addition to this, load capacitance on the system bus 4 is small. These factors shorten a time of reading data from any bank register for the system bus 4.

As explained above, the present invention transfers data between bank registers and a system bus through dedicated write and read buses and an interface, or through data transfer buses and an interface, arranged between the bank registers and the system bus, to reduce the size of each bank register and shorten a time of reading data from the bank registers for the system bus.

What is claimed is:

1. A bank register circuit of a multiply accumulate circuit (MAC), comprising:
   a plurality of first bank registers connected to the MAC, for storing multiplicants;
   a plurality of second bank registers connected to the MAC, for storing multipliers;
   a dedicated write bus connected to said first and second bank registers, for transferring data from a system bus to said bank registers;
   a dedicated read bus connected to said first and second bank registers, for transferring data from the first and second bank registers to the system bus, wherein said first bank registers are connected to said dedicated read bus in parallel; and
   a bus interface arranged between and connected to the system bus and said dedicated write and read buses, for interfacing data transfer between the system bus and said dedicated write and read buses.

2. The bank register circuit as claimed in claim 1, wherein said bus interface has:
   a write circuit made of an inverter string for writing data of the system bus into said dedicated write bus;
   a NAND gate for providing the NAND of a clock signal, a read control signal, and a bank register area signal that specifies one of said bank registers;
   a hold circuit connected to said dedicated read bus, for temporarily holding data of said dedicated read bus;
   a NOR gate for providing the NOR of the output of the NAND gate and data from said dedicated read bus; and
   a read circuit made of an FET whose conductivity is controlled by the output of the NOR gate, for passing data from said dedicated read bus to the system bus.

3. A bank register for a multiply accumulate circuit (MAC), comprising:
   a plurality of first bank registers connected to the MAC, for storing multiplicants;
   a plurality of second bank registers connected to the MAC, for storing multipliers;
   a data transfer bus connected to said bank registers and the MAC, for transferring data from a system bus to said bank registers, from said bank registers to the MAC, and from said bank registers to the system bus, wherein said first bank registers are connected to said data transfer bus in parallel; and
   a bus interface arranged between and connected to the system bus and said data transfer bus, for interfacing data transfer between the system bus and said data transfer bus.

4. The bank register circuit as claimed in claim 3, wherein said bus interface has:
   a write circuit made of an inverter string including a clocked inverter whose conductivity is controlled by the product of a write control signal and a bank register area signal that specifies one of said bank registers, for writing data of the system bus into said data transfer bus;
   a hold circuit connected to said data transfer bus, for temporarily holding data of said data transfer bus;
   a NAND gate for providing the NAND of a clock signal, a read control signal, and the bank register area signal;
   a NOR gate for providing the NOR of the output of the NAND gate and data from said data transfer bus; and
   a read circuit made of an FET whose conductivity is controlled by the output of the NOR gate, for passing data from said data transfer bus to the system bus.

5. A bank register circuit for a multiply accumulate circuit (MAC), comprising:
   a plurality of first bank registers connected to the MAC and configured to store multiplicants;
   a plurality of second bank registers connected to the MAC and configured to store multipliers;
   a dedicated write bus connected to said first and second bank registers, and configured to transfer data from a system bus to said bank registers;
   a dedicated read bus connected to said first and second bank registers, and configured to transfer data from the first and second bank registers to the system bus, wherein said first bank registers are connected to said dedicated read bus in parallel; and
   a bus interface arranged between and connected to the system bus and said dedicated write and read buses, and configured to interface data transfer between the system bus and said dedicated write and read buses.

6. The bank register circuit as claimed in claim 5, wherein said bus interface comprises:
   a write circuit made of an inverter string configured to write data of the system bus to said dedicated write bus;
   a NAND gate configured to provide the NAND of a clock signal, a read control signal, and a bank register area signal that specifies one of said bank registers;
   a hold circuit connected to said dedicated read bus, and configured to temporarily hold data of said dedicated read bus;
   a NOR gate configured to provide the NOR of the output of the NAND gate and data from said dedicated read bus; and
   a read circuit made of an FET having a conductivity which is a function of the output of the NOR gate, and configured to pass data from said dedicated read bus to the system bus.

7. A bank register circuit for a multiply accumulate circuit (MAC), comprising:

a plurality of first bank registers connected to the MAC and configured to store multiplicants;

a plurality of second bank registers connected to the MAC and configured to store multipliers;

a data transfer bus connected to said bank registers and the MAC, and configured to transfer data from a system bus to said bank registers, from said bank registers to the MAC, and from said bank registers to the system bus, wherein said first bank registers are connected to said data transfer bus in parallel; and a bus interface arranged between and connected to the system bus and said data transfer bus, and configured to interface data transfer between the system bus and said data transfer bus.

8. The bank register circuit as claimed in claim 7, wherein said bus interface comprises:

a write circuit made of an inverter string including a clocked inverter whose conductivity is a function of the product of a write control signal and a bank register area signal that specifies one of said bank registers, and configured to write data of the system bus to said data transfer bus;

a hold circuit connected to said data transfer bus, and configured to hold temporarily data of said data transfer bus;

a NAND gate configured to provide the NAND of a clock signal, a read control signal, and the bank register area signal;

a NOR gate configured to provide the NOR of the output of the NAND gate and data from said data transfer bus; and a read circuit made of an FET whose conductivity is a function of the output of the NOR gate, and configured to pass data from said data transfer bus to the system bus.

* * * * *